United States Patent [19]

Hodges

[11] Patent Number: 4,784,429
[45] Date of Patent: Nov. 15, 1988

[54] COLLAPSIBLE CAMPER TOP FOR PICK-UP TRUCKS

[76] Inventor: Jesse L. Hodges, P.O. Box 54, French Camp, Miss. 39745

[21] Appl. No.: 895,714

[22] Filed: Aug. 12, 1986

[51] Int. Cl.$^4$ .............................. B60P 3/32; B60P 7/02
[52] U.S. Cl. .................................... 296/165; 296/175; 296/100; 296/26; 160/202; 49/483
[58] Field of Search ................... 296/10, 26, 164, 165, 296/171, 172, 175, 176, 100; 49/125, 197, 483, 496; 160/202, 218, 223

[56] References Cited

U.S. PATENT DOCUMENTS

| | | | |
|---|---|---|---|
| 1,608,458 | 11/1926 | Barbiers | 296/99 R |
| 2,756,468 | 7/1956 | Bright | 49/496 X |
| 2,850,089 | 9/1958 | Burke | 160/202 |
| 3,273,934 | 9/1966 | Hagenson | 296/26 |
| 3,376,668 | 4/1968 | Smedstad | 296/10 X |
| 3,578,378 | 5/1971 | Anderson | 296/100 |
| 3,598,441 | 8/1971 | Damiani | 296/164 |
| 3,833,954 | 9/1974 | Daughenbaugh et al. | 296/171 |
| 3,885,826 | 5/1975 | Kropf | 296/171 |
| 4,397,497 | 8/1983 | Alonzo Jr. et al. | 296/26 |
| 4,659,136 | 4/1987 | Martin et al. | 296/100 |

FOREIGN PATENT DOCUMENTS

| | | | |
|---|---|---|---|
| 1172289 | 8/1984 | Canada | 296/156 |
| 811585 | 4/1937 | France | 296/171 |
| 1219426 | 5/1960 | France | 296/100 |
| 1372826 | 8/1964 | France | 296/100 |

Primary Examiner—Dennis H. Pedder
Attorney, Agent, or Firm—John M. Harrison

[57] ABSTRACT

A collapsible camper top for pick-up trucks which is characterized by multiple nesting and telescoping sections which are sealed by bottom and top reverse curved, rubber seal members and are adapted to extend and cove the bed of a pick-up truck. The number of nesting sections which are used is dictated by the length of the pick-up truck bed and the sections are nested and retracted in accordion-like fashion inside a fixed section to expose the bed of the pick-up truck for hauling purposes. In a preferred embodiment the nesting sections are mounted on rollers which operate in plate slots provided in roller plates carried by the side rails of the pick-up truck. In another preferred embodiment the nesting sections are extended and retracted by means of a chain drive system which is operated by an electric motor or is capable of hand-operation by a crank. A rear window slides inside tracks provided in the end collapsible section to open the rear end of the collapsible camper top and is deployed outwardly and downwardly of the tracks to close the end section of the collapsible camper top.

5 Claims, 3 Drawing Sheets

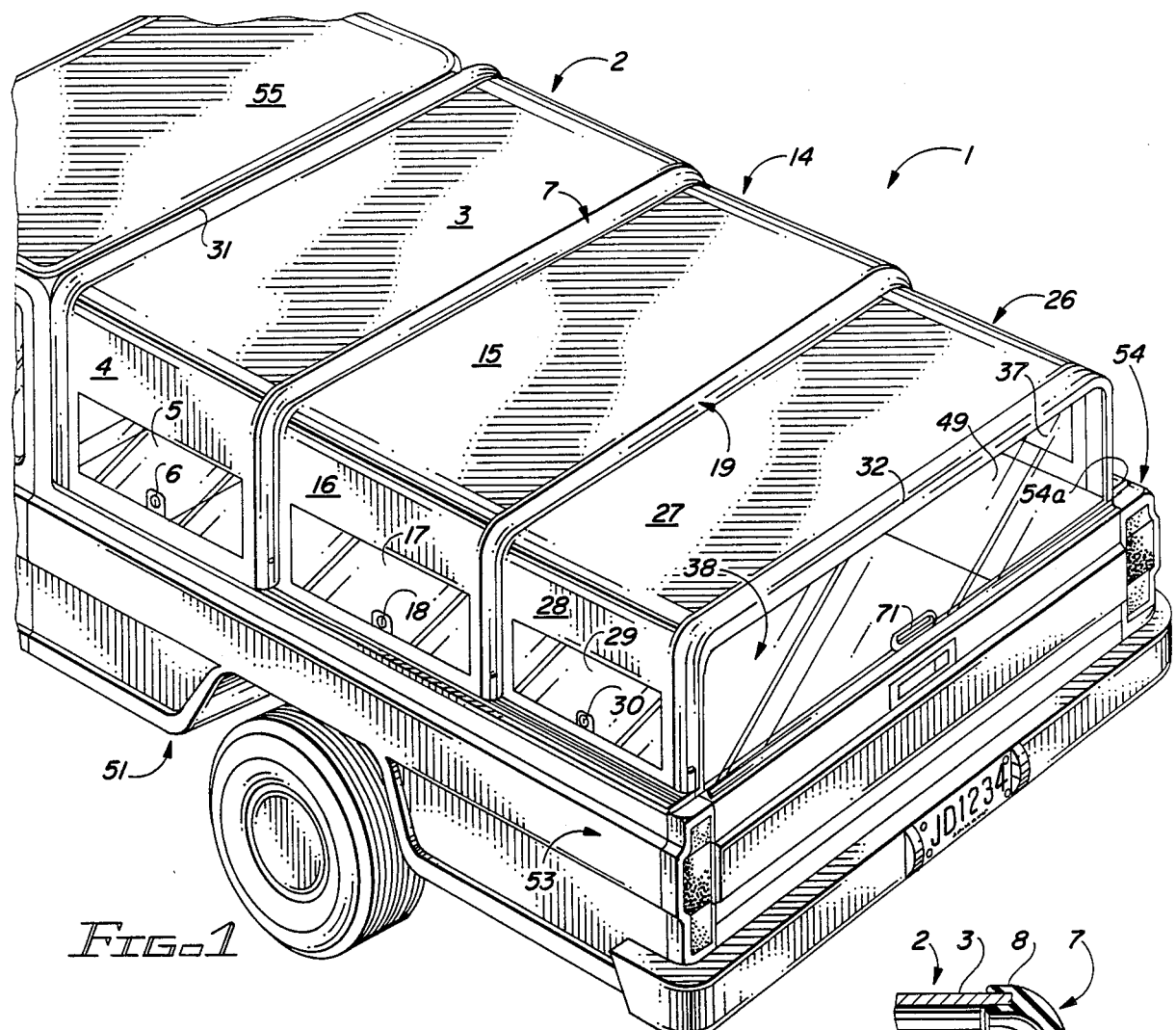
Fig. 1
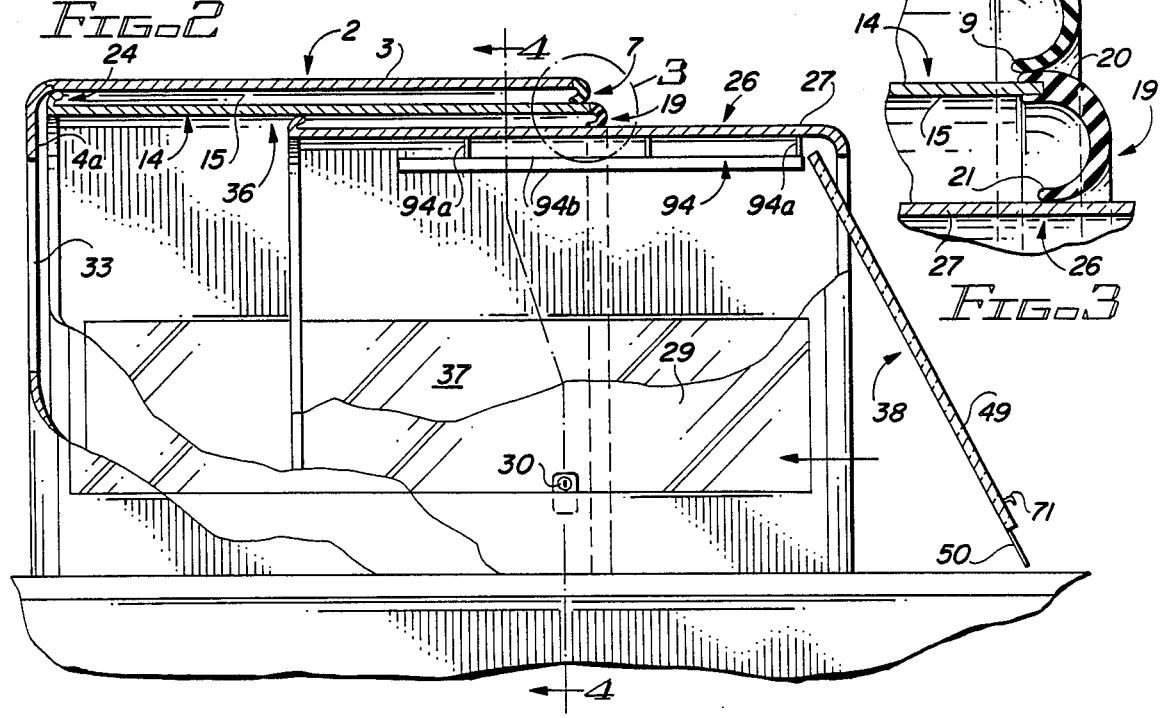
Fig. 2
Fig. 3

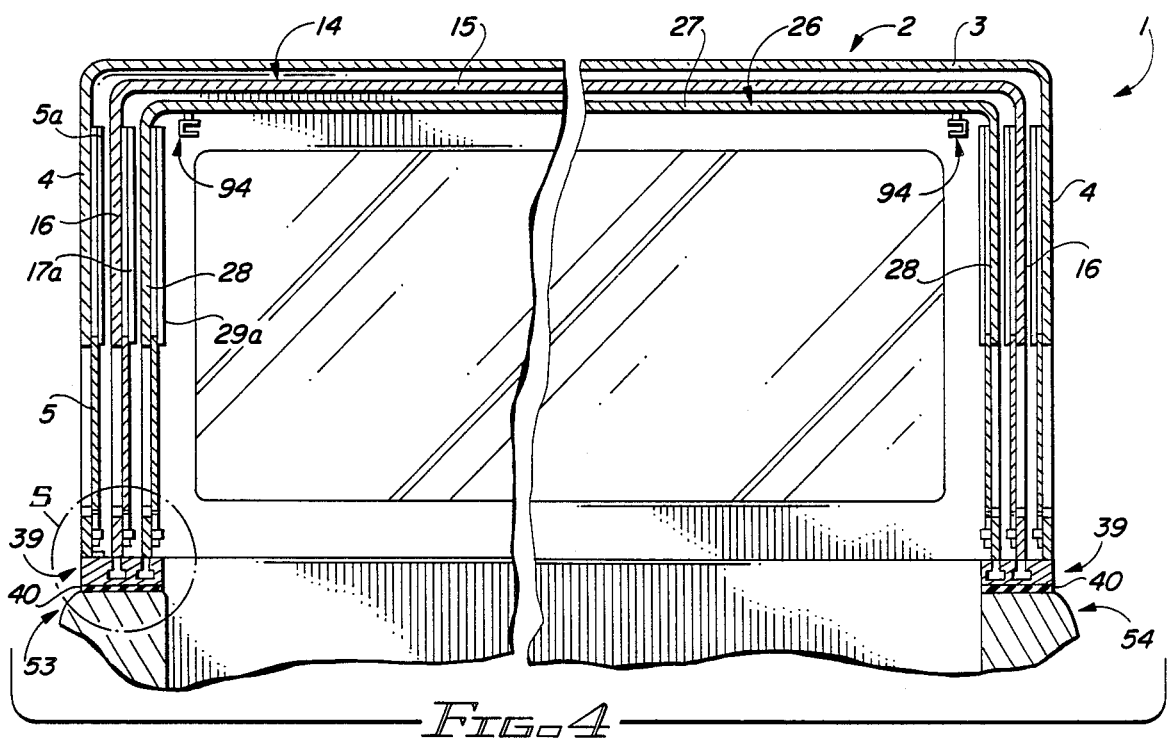
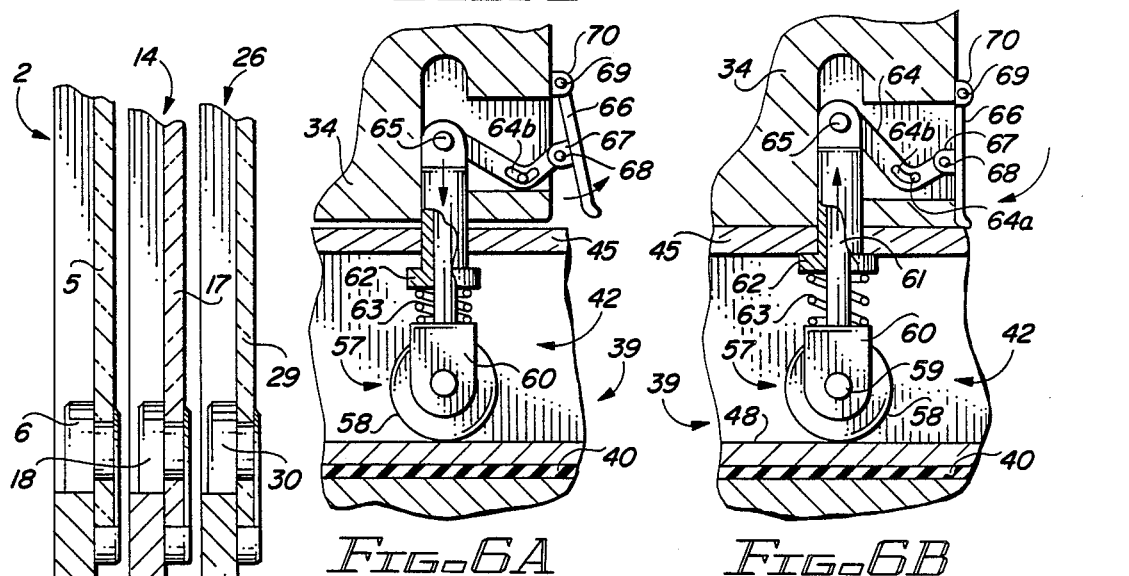
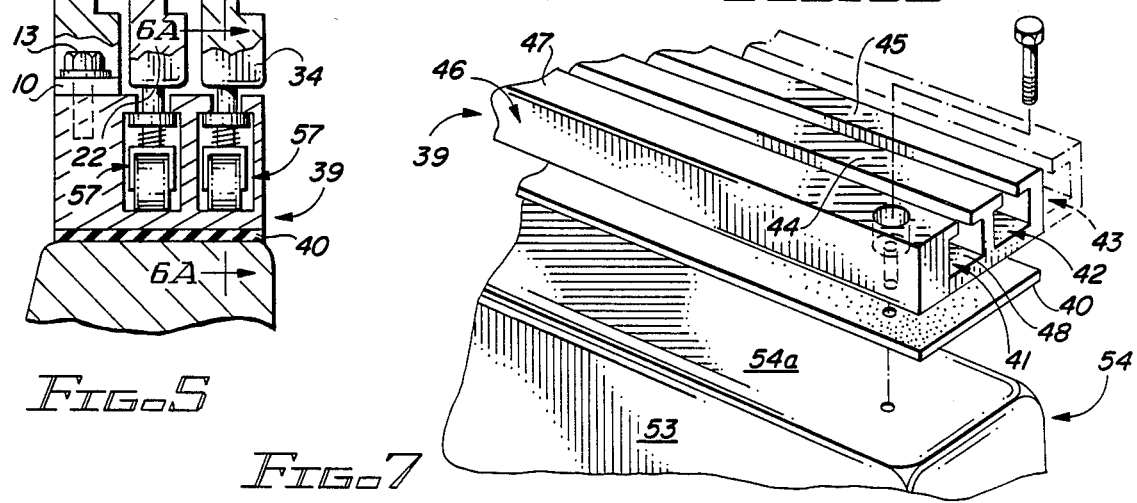

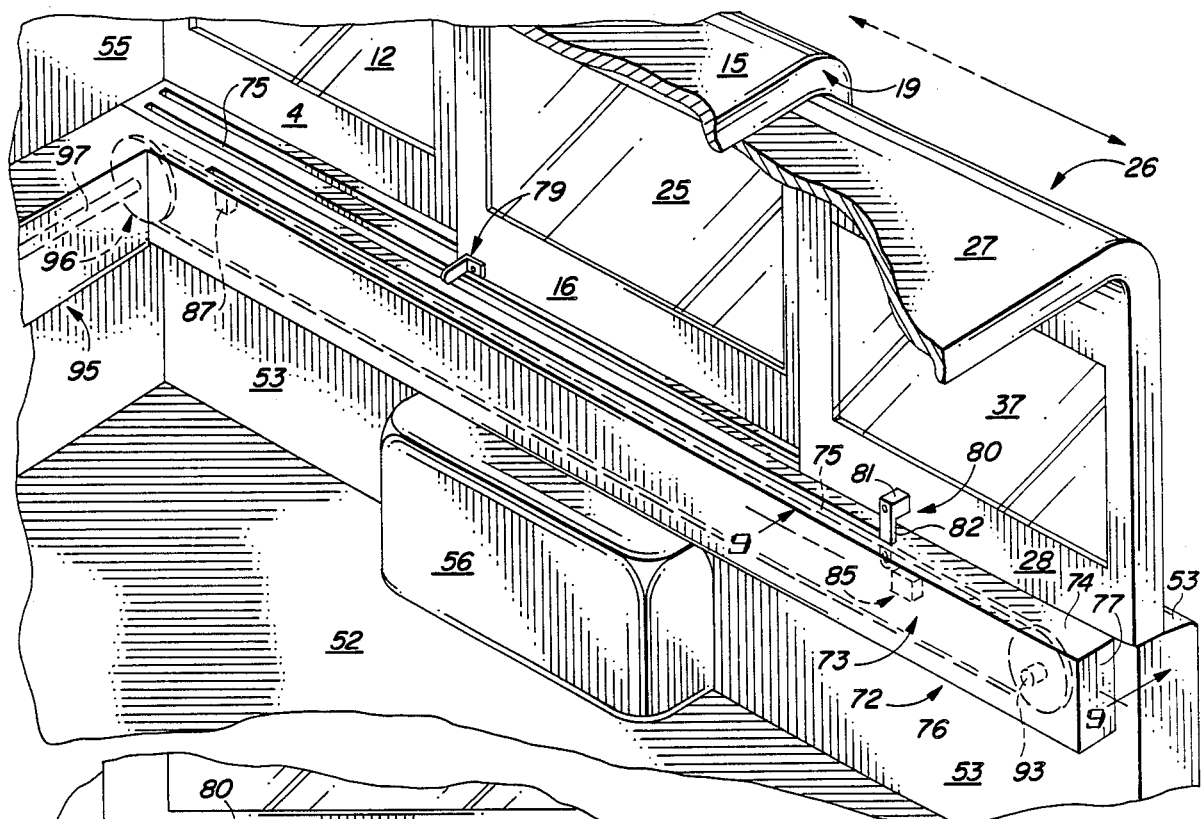
FIG.-8
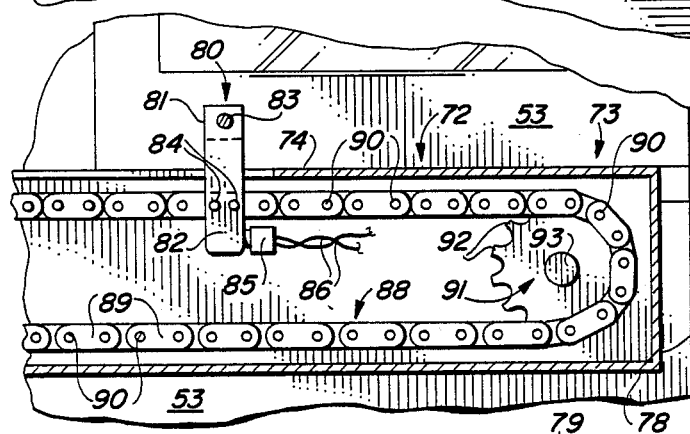
FIG.-9
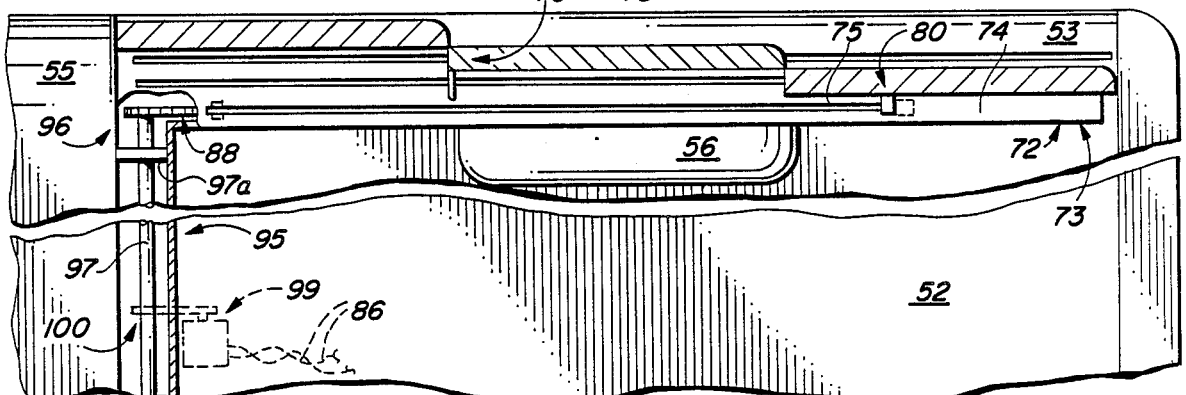
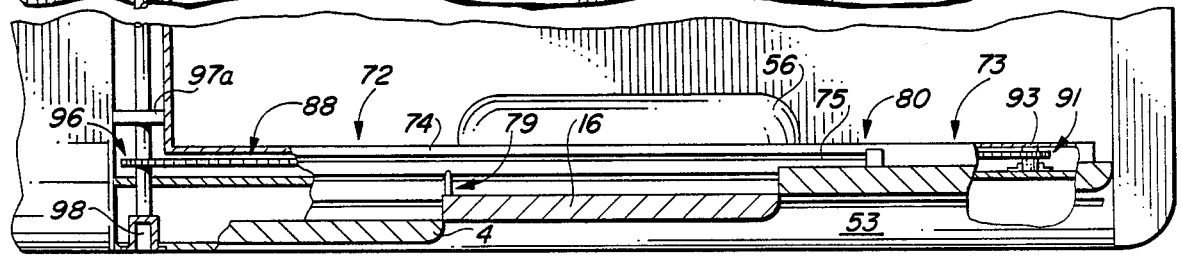
FIG.-10

COLLAPSIBLE CAMPER TOP FOR PICK-UP TRUCKS

BACKGROUND OF THE INVENTION

1. Field of the Invention

This invention relates to camper tops and enclosures for pick-up trucks and more particularly, to a collapsible, nesting camper top for pick-up trucks. The collapsible camper top is characterized by multiple, nesting sections which retract in accordion-like, telescoping configurations to expose the pick-up truck bed for hauling, and extend to cover the bed for camping or enclosing cargo. In a preferred embodiment of the invention the respective sections of the collapsible camper top are sealed by curved rubber seal members and each respective section other than the front, fixedly mounted section, is mounted on a roller system which is guided by a roller plate attached to the side rails of the pick-up truck. Each of the sections is further provided with at least one access panel to permit access to the interior of the collapsible camper top when the respective sections are deployed to enclose the pick-up truck bed. In another preferred embodiment of the invention a chain drive system is employed to either automatically or manually retract and extend the movable middle and end sections with respect to the fixed front section and each other, in order to enclose or expose the pick-up truck bed, as desired.

2. Description of the Prior Art

Various types of extension enclosures have long been used in vehicles such as trailers. U.S. Pat. No. 2,995,398, dated Aug. 8, 1961, to J. R. Davenport, discloses an "Expandable Trailer" which includes a primary trailer segment provided with wheels and a trailer hitch in a conventional design and includes an expandable segment which is designed to fit inside the primary segment and to selectively expand outwardly to increase the size of the trailer. U.S. Pat. No. 3,212,810, dated Oct. 19, 1965, to A. B. Bass, discloses a "Collapsible House Trailer" which is similar in design to the Davenport expandable trailer. Like the Davenport trailer, the collapsible house trailer detailed in this patent includes a primary trailer section provided with wheels and a conventional trailer hitch and a secondary collapsible section which is nested within the primary section and is expandable from the primary section to increase the size of the house trailer. A "Floatable, Telescoping, Transportable Shelter" is disclosed in U.S. Pat. No. 3,833,954, dated Sept. 10, 1974, to R. S. Daughenbaugh, et al. The shelter detailed in this patent includes an end section containing a plurality of telescoping middle sections which are extended from the end section to form the shelter. A bulkhead provides a cover for the end section and the closure member for the last telescoped middle section. Seals for rendering the shelter water-tight are also provided and wheels are attached to one side of the end section such that the shelter must be tipped over on its bottom to slide out the telescoping middle section. U.S. Pat. No. 4,133,571, dated Jan. 9, 1979, to Frank T. Fillios, discloses a "Expandable Camper Body". This patent details an expandable camper body having an aft section which telescopes within a forward section and folding support tracks for guiding and supporting the aft section when extended, with the support tracks providing an extension of tracks within the forward section. Hydraulic power is also provided for raising and lowering the support tracks and the powered gear drive to extend and retract the aft section on the tracks. Flexible utility connections are provided, such that all utilities are operative in the extended or retracted positions. A "Camper Module" is disclosed in U.S. Pat. No. 4,163,577, dated Aug. 7, 1979, to I. C. Vanderslice. The camper module is characterized by a removable and foldable device which converts a utility vehicle such as a van, into a recreational vehicle. The camper module includes kitchen cabinets and storage area with bench-type seats attached to the opposite side of the kitchen area. When the module is collapsed it can be easily removed from the van by two people and in the expanded mode the module provides the necessary fixtures which are normally used in a recreational vehicle. For ease of storage and handling, the camper module folds in the center of the vehicle, forming a compact, rectangular package.

It is an object of this invention to provide a collapsible camper top for pick-up trucks, which collapsible camper top is characterized by multiple nesting sections that successively telescope or retract and nest within the fixed largest of the sections and each other and extend to cover the entire pick-up truck bed in deployed configuration.

Another object of the invention is to provide a new and improved collapsible camper top for pick-up trucks, which camper top includes multiple telescoping or nesting sections that are sized such that the sections nest together within the confines of the fixed largest one of the sections, each of which sections is detachably sealed with respect to the companion section or sections to prevent water intrusion and protect cargo or occupants during inclement weather.

Yet another object of this invention is to provide a collapsible camper top for mounting on the side rails or bed sides of pick-up trucks, which camper collapsible top is characterized by multiple nesting sections that are retractable in telescoping, nesting configuration into a fixed section located adjacent the cab of the truck, and are extendable in deployed position to protect the entire area of the pick-up truck bed, which movable sections are also mounted on rollers to facilitate convenient retraction and extension thereof with respect to the fixed section.

A still further object of the invention is to provide a collapsible camper top for pick-up trucks, which collapsible camper top includes a plurality of nesting sections of dissimilar size, a rear window slidably mounted in the end section and a chain drive system mounted in the pick-up truck bed to facilitate telescoping of the sections within the confines of the fixedly mounted largest one of the sections when in retracted configuration and extension of the movable sections across the pick-up truck bed when in extended or deployed configuration.

SUMMARY OF THE INVENTION

These and other objects of the invention are provided in a collapsible camper top for a pick-up truck which includes multiple, nesting sections of successively dissimilar size, which sections are sealed with respect to each other when in extended configuration and are adapted to nest and telescope into retracted configuration within the largest of the sections, which is stationary. In a preferred embodiment, opposing sets of rollers which are attached to the sides of the movable sections facilitate traversal of the sections in roller plates secured to the bed rails and each section is provided with at least one access panel to provide access to the pick-up truck bed when the sections are deployed to cover the bed. A rear window is slidably mounted in parallel tracks provided in the end collapsible section and is designed to open and close the collapsible camper top and optional side windows are also provided in the section sides, located opposite the access panels.

BRIEF DESCRIPTION OF THE DRAWINGS

The invention will be better understood by reference to the accompanying drawings wherein:

FIG. 1 is a perspective view of a preferred embodiment of the collapsible camper top in deployed position on a pick-up truck;

FIG. 2 is a side sectional view of the collapsible camper top illustrated in FIG. 1;

FIG. 3 is an enlarged sectional view of preferred bottom seals installed in the trailing edges of the collapsible camper sections;

FIG. 4 is a sectional view of the collapsible camper top taken along line 4—4 in FIG. 2;

FIG. 5 is an enlarged view of a preferred roller system for the respective movable sections of the collapsible camper top;

FIG. 6A is a side sectional view of one of the rollers illustrated in FIG. 5, with the roller in traverse configuration;

FIG. 6B is a side sectional view of the roller illustrated in FIG. 6A in locked configuration;

FIG. 7 is a perspective view, partially in section, of a preferred roller plate and plate pad for mounting on the pick-up truck side rails and receiving the rollers illustrated in FIGS. 5, 6A and 6B;

FIG. 8 is a perspective view, partially in section, of an automatic and manual retraction and extension system for retracting and extending the movable sections of the collapsible camper top;

FIG. 9 is a secitonal view of preferred chain drive and sprocket components of the extension and retraction system, taken along line 9—9 in FIG. 8; and FIG. 10 is a top view, partially in section, of the pick-up truck and the retraction and extension system illustrated in FIGS. 8 and 9, mounted in cooperation with the collapsible camper top.

DESCRIPTION OF THE PREFERRED EMBODIMENTS

Referring initially to FIGS. 1-4 of the drawings the collapsible camper top of this invention is generally illustrated by reference numeral 1. The collapsible camper top 1 consists of a stationary front section 2, a slightly smaller middle section 14 and a slightly smaller yet end section 26, which engage each other at the front section bottom seal 7 and the middle section bottom seal 19, respectively. When in extended configuration as illustrated in FIG. 1, the collapsible camper top 1 is designed to cover and enclose the truck bed 52 (illustrated in FIG. 8) of the pick-up truck 51 and is mounted on the top surface 54a of the side rails 54, as hereinafter described. The front section 2 of the collapsible camper top 1 is larger than either the middle section 14 or the end section 26 and is characterized by a generally flat front section top 3 which extends downwardly at each end to define parallel front section sides 4, that are bolted or otherwise secured to the top surface 54a. A front section end 4a closes the front end of the front section 2 and is provided with a front window 33, as illustrated in FIG. 2. A fixed seal 31 seals the gap between the front section 2 and the cab 55 of the pick-up truck 51. A front access panel 5 is slidably disposed in a front section casement 5a, located in one of the front section sides 4 and is provided with a front panel lock 6 therein, to secure the front access panel 5 in closed configuration, as illustrated. As further illustrated in FIGS. 2 and 3 of the drawing the flexible and resilient front section bottom seal 7 is characterized by a front seal base 8, which is attached to the trailing edges of the front section top 3 and front section sides 4 and the front section bottom seal 7 extends in curved relationship downwardly from the front section top 3 and inwardly of the front section sides 4, to define a front seal tip 9. As further illustrated in FIG. 1, the middle section 14 is located adjacent to the front section 2 and is characterized by a middle section top 15, which extends downwardly at the ends thereof to define parallel middle section sides 16. A middle access panel 17 is slidably disposed in a middle section casement 17a, located in one of the middle section sides 16 and is provided with a middle panel lock 18, in order to secure the middle access panel 17 in locked configuration. The flexible and resilient middle section bottom seal 19 is disposed along the trailing edges of the middle section top 15 and the middle section sides 16, as illustrated in FIG. 3 and like the front section bottom seal 7, curves from a middle seal base 20 which is attached to the trailing edge of the middle section top 15, downwardly from the middle section top 15 and inwardly of the middle section sides 16, to terminate in a middle seal tip 21, as illustrated. An end section 26 is provided with a generally flat end section top 27 which extends downwardly at the ends to define the end section sides 28, one of which end section sides 28 is provided with an end access panel 29 slidably located in an end section casement 29a. An end panel lock 30 is provided in the end access panel 29, in order to secure the end access panel 29, in the closed configuration.

Referring again to FIGS. 2 and 3 of the drawings it will be appreciated that the front section 2 is fixedly mounted with respect to the cab 55 of the pick-up truck 51 and is larger than either the middle section 14 or the end section 26. Furthermore, the middle section 14 is designed to telescope inwardly and nest into the front section 2. Similarly, the end section 26 is smaller than the middle section 14 and is designed to nest into and telescope inwardly of the middle section 14, such that both the end section 26 and the middle section 14 are retracted into the confines of the front section 2 when the collapsible camper top 1 is manipulated into the retracted configuration. This folding or nesting sequence is illustrated in FIGS. 2 and 3 and when the collapsible camper top 1 is in the retracted configuration the front section bottom seal 7 and the middle section bottom seal 19 are located adjacent to each other as illustrated in FIG. 3, with the front seal tip 9 of the front section bottom seal 7 engaging the middle seal base 20 of the middle section bottom seal 19. Furthermore, as illustrated in FIG. 2, when the collapsible camper top 1 is extended as illustrated in FIG. 1, an upwardly and rearwardly-curved middle section top seal 24, which is attached to the leading edges of the middle section top 15 and the middle section sides 16 of the middle section 14, engages the front section bottom seal 7 in a reverse-curve, sealing relationship, in order to seal the front section 2 with respect to the middle section 14. Additionally, an upwardly and rearwardly-curved end section top seal 36, which is secured to the leading edges of the end section 27 and the end section sides 28 of the end section 26, also engages the middle section bottom seal 19 provided in the middle section 14 in a reverse-curve, sealing relationship, to seal the middle section 14 with respect to the end section 26. In a most preferred embodiment of the invention the middle section top seal 24 and the end section top seal 36 are shaped to define a seal tip and seal base (not illustrated in detail) in the same manner as the front section bottom seal 7 and the middle section bottom seal 19.

Referring now to FIGS. 4–7 of the drawings in another preferred embodiment of the invention the front section sides 4 of the front section 2 of the collapsible camper top 1 are each fitted with a front section foot 10, which is bolted to a slotted roller plate 39, sealed on a protective, resilient plate pad 40, and to the side rail top 54a of the side rails 54, by means of bolts 13. As further illustrated in FIG. 5 each of the middle section sides 16 of the middle section 14 are provided with a middle section foot 22, and a pair of roller assemblies 57 are attached to each middle section foot 22, as illustrated. Another pair of roller assemblies 57 is provided on each end section foot 34, which terminate the end section sides 28. The roller assemblies 57 located on the middle section foot 22 fit in the inside plate slot 41 of the roller plate 39 and each roller 58 rolls on the flat slot floor 48. Each roller 5 is prevented from exiting the inside plate slot 41 by contact between the lower end of the the shaft housing 62 and the T-flange 44 and shoulder flange 47, extending from the plate shoulder 46, provided in the roller plate 39. Similarly, the roller assemblies 57 which are located on the end section foot 34 fit in the middle plate slot 42 of the roller plate 39 and the rollers 58 roll on the floor 48 and are prevented from exiting the middle plate slot 42 by contact between the lower end of the shaft housing 62 and the T-flange 44 and the L-flange 45. An outside plate slot 43 is illustrated in phantom and can be fabricated in each of the roller plates 39, in case another section (not illustrated) is to be added to the collapsible camper top 1 to cover long pick-up trucks. As further illustrated in FIGS. 6A and 6B, the roller assemblies 57 which are attached to the end section foot 34 are each further characterized by a roller 58 which is attached to a roller bracket 60 by means of a roller pin 59. The roller bracket 60 is carried by a roller shaft 61 which extends upwardly into a shaft housing 62, with a roller spring 63 provided between roller bracket 60 and the lower end of the shaft housing 62. One end of a link arm 64 is pivotally attached to the top of the shaft housing 62 by means of a link pin 65 and the opposite end of the link arm 64 is pinned to the lock arm bracket 67 of a lock arm 66 by means of a bracket pin 68. The link arm 64 is L-shaped in configuration and the elbow of the L-shaped link arm 64 is attached by means of an elbow pin 64A, extending through a pin slot 64b, to the end section foot 34. The lock arm 66 is also pivotally attached to a mount bracket 70, carried by the end section foot 34 by means of a lock arm pin 69, such that the free end of the lock arm 66 can be pivoted outwardly in the direction of the arrow as illustrated in FIG. 6A, to free each of the rollers 58 in the roller assemblies 57 to roll on the slot floor 48 inside the inside plate slot 41 and the middle plate slot 42, respectively. Conversely, the free end of the lock arm 66 can be pushed inwardly in the direction of the arrow as illustrated in FIG. 6B, to force the shaft housing 62 upwardly against the L-Flange 45 and prevent the roller assemblies 57 from traversing the middle plate slot 42.

Referring now to FIGS. 8–10 of the drawings, and particularly to FIG. 8, one of the front section sides 4, middle section sides 16 and end section sides 28 are provided with a front section window 12, a middle section window 25 and an end section window 37, respectively. Furthermore, in yet another preferred embodiment of the invention, the collapsible camper top 1 is provided with a pair of drive systems 72 which are designed to automatically or manually extend and retract the middle section 14 and the end section 26 with respect toi the front section 2 and the cab 55 of the pick-up truck 51. Each drive system 72 is characterized by a chain housing 73 which is welded or otherwise attached to the bed sides 53, respectively, and is defined by a top plate 74, capped by a slotted top plate 75 and a side plate 76 and is terminated on one end by an end plate 77. A bottom plate 78 closes the chain housing 73 and the chain housing 73 extends substantially along the entire length of the truck bed 52 above the wheel wells 56 of the pick-up truck 51. A pick-up cleat 79 is fitted to each of the middle section sides 16 of the middle section 14 in spaced relationship with respect to a pair of oppositely-disposed drive cleats 80, which are attached by means of cleat blocks 81 and block screws 83 to the end section sides 28 of the end section 26, respectively, as illustrated in FIG. 8. A cleat arm 82 extends downwardly from each cleat block 81 and projects through a longitudinal top plate slot 75 located in each of the top plates 74. The extending end of each cleat arm 82 is attached to a pair of chain links 89 in the drive chains 88, which are disposed linearly inside the chain housings 73, respectively, as illustrated in FIG. 9. Each drive chain 88 is defined by multiple chain links 89 attached by link pins 90 and the projecting ends of the cleat arms 82 are secured between two of the chain links 89 by means of the arm pins 84, as illustrated in FIG. 9. A rear limit switch 85 is located inside each chain housing 73 immediately adjacent to each cleat arm 82 when the middle section 14 and end section 26 are fully deployed, as illustrated in FIG. 8. A front limit switch 87 is also provided inside each of the chain housings 73 immediately below the front section side 4 of the front section 2, the front limit switches 87 and rear limit switches 85 being designed to limit the travel of the drive cleats 80 in the top plate slots 75 as the middle section 14 and end section 26 are extended and retracted, as hereinafter described. The chain links 89 of the drive chains 88 traverse the sprocket teeth 92 of the idler sprockets 91, each of which is rotatably secured by means of a sprocket shaft 93 to the bed sides of the pick-up truck 51. A pair of drive sprockets 96 are provided at opposite ends of a drive shaft 97, and are positioned near the bed sides 53 adjacent to the cab 55. The drive sprockets 96 are also enclosed in the chain housings 73, respectively, and as in the case of the idler sprocket 91, the drive sprockets 96 are provided with sprocket teeth (not illustrated) for driving the drive chains 88, respectively, as hereinafter described. The drive shaft 97 is journalled for rotation in a pair of shaft supports 97A, located inside a shaft housing 95 which spans the distance between the bed sides 53 of the truck bed 52 and intersects each drive system 72, as illustrated in FIGS. 8 and 10.

Referring to FIG. 10 of the drawings a motor 99 is secured to the truck bed 52 and is linked to the drive shaft 97 by means of a motor drive chain 100, which is driven by a pair of drive sprockets (not illustrated), one of which drive sprockets is attached to the motor shaft of the motor 99 and the other which is carried by the drive shaft 97. A crank socket 98 is provided on one end of the drive shaft 97 for receiving a crank (not illustrated) in order to drive the drive shaft 97 manually without the use of the motor 99, as necessary. The switch wiring 86 connects the rear limit switch 85 and the front limit switch 87 to the motor 99 and to a motor activation switch (not illustrated) located in the cab 55 of the pick-up truck 51.

Referring now to FIGS. 1, 2, and 4 of the drawings in a most preferred embodiment of the invention a rear window 38 is provided in the end section 26 of the collapsible camper top 1 and serves to close the collapsible camper top 1 when the collapsible camper top 1 is in the extended configuration as illustrated in FIG. 1. The rear window 38 includes a rectangular-shaped window pane 49 which is supported in the open position by a pair of oppositelydisposed, parallel rear window tracks 94, having track flanges 94b and supported from the end section top 27 by track supports 94a. The rear window 38 is provided with a handle 71, a flap 50 and a lock (not illustrated provided in cooperation with the handle 71 according to the knowledge of those skilled in the art, for securing the rear window 38 in closed configuration as illustrated in FIG. 1.

It will be appreciated from a consideration of the drawings that the collapsible camper top 1 for pick-up trucks is capable of being collapsed and extended, either manually or by operation of the motor 99, depending on whether or not the drive system 72 is utilized in cooperation with the collapsible camper top 1. If the motor 99 is not used to retract and extend the middle section 14 and the end section 26, a suitable crank tool can be inserted in the crank socket 98 of the drive shaft 97 and the collapsible camper top extended and retracted manually, as desired. Furthermore, under circumstances where no drive system 72 is used, the middle section 14 and the end section 26 can be easily extended and retracted inside the front section 2 by simply pushing and pulling the end section top 27 of the end section 26, as necessary.

In operation, referring to the drawings, when it is desired to retract the middle section 14 and the end section 26 into the front section 2 by using the motor 99, the rear window 38 is first slidably positioned in the rear window tracks 94 to open the end section 26 and the motor 99 is initially energized by operating a switch located in the cab. When the motor 99 is so energized, the motor drive chain 100, illustrated in FIG. 10, is caused to turn and the drive shaft 97 and drive sprockets 96 are caused to rotate, driving the drive chains 88. This action causes the drive cleats 80 to move forwardly in the top plate slots 75 toward the pick-up cleats 79. As the drive cleats 80 move forwardly, the end section 26 also moves forwardly in telescoping fashion into the middle section 14. When the drive cleats 80 engage the projecting pick-up cleats 74, which are attached to the middle section sides 16 of the middle section 14, the pick-up cleats 79 and the middle section 14 begin to move in concert forwardly along with the drive cleats 80 and the end section 26, until the cleat arms 82 engage the front limit switches 87. Contact between the cleat arms 82 and the front limit switches 87 terminates the electric current flowing through the switch wiring 86 and stops the motor 99. At this point the end section 26 is nested inside the middle section 14 and the middle section 14 is in turn nested inside the front section 2. When it is desired to again deploy the collapsible camper top 1 into the configuration illustrated in FIG. 1, the switch is again operated to cause the motor 99 to operate in the reverse direction, thus reversing the direction of movement of the drive chains 88. This action causes the drive cleats 80 to move rearwardly with the drive chains 88 and extend the end section 26 from the middle section 14 and the front section 2. When the end section top seal 36, which is attached to the end section 26, engages the middle section bottom seal 19, attached to the middle section 14, the middle section 14 is pulled rearwardly with the end section 26. This action removes the middle section 14 from the nested configuration within the front section 2 and when the cleat arm 82 of the drive cleat 80 engages the rear limit switch 85, the motor 99 is again stopped and the collapsible camper top 1 is again fully deployed, as illustrated in FIG. 1.

Referring again to FIG. 10, if it is desired to retract the collapsible camper top manually, the engaging end of a suitable crank (not illustrated) is inserted in the crank socket 98 and the drive shaft 97 is rotated to operate the drive chain and drive cleat forwardly and retract the collapsible camper top 1, as described above. Extension of the collapsible camper top 1 by manual operation is then achieved by turning the crank in the opposite direction. Furthermore, retraction and extension of the collapsible camper top 1 can also be effected by exerting forward and reverse pressure on the end section 26 after removing the arm pins 84 from the cleat arms 82 and the drive chains 88, thereby detaching the drive system 72 from the end section 26.

Referring again to FIGS. 1 and 2 of the drawings, it will be appreciated that the rear window 38 is maintained in the closed position as illustrated in FIG. 1, by pressure exerted by the window pane 49 against the rear window seal 32, which borders the trailing edge of the rear window 38. This closed position is further facilitated by the handle 71, which is fitted with a conventional engaging member (not illustrated) for engaging a lock bar (not illustrated) provided on the pick-up truck 51.

It will be understood that the collapsible camper top 1 can be positioned in retracted configuration and easily stored and shipped for mounting on the pick-up truck 51.

While the preferred embodiments of the invention have been described above, it will be recognized and understood that various modifications may be made therein and the appended claims are intended to cover all such modifications which fall within the spirit and scope of the invention.

Having described my invention with the particularity set forth above, what is claimed is:

1. A collapsible camper top for a pick-up truck having a pair of side rails, comprising a front section having a front section top and front section sides downwardly extending from said front section top in spaced relationship, said front section sides each terminating in a front section foot, with each front section foot fixedly carried by the side rails of the pick-up truck, respectively; at least one middle section having a middle section top and middle section sides downwardly extending from said middle section top in spaced relationship, said middle section sides each terminating in a middle section foot, with each middle section foot slidably carried by the side rails of the pick-up truck, respectively, said middle section adapted to selectively nest and retract inside said front section in telescoping fashion and extend from said front section in operational configuration; an end section having an end section top and end section sides downwardly extending from said end section top in spaced relationship, said end section sides each terminating in an end section foot with each end section foot slidably carried by the side rails of the pick-up truck, respectively, said end section adapted to selectively nest and retract inside said middle section in telescoping fashion and extend from said middle section in operational configuration; a front section rear seal base attached to the trailing edge of said front section and a front section rear seal tip projecting from said front section rear seal base in downwardly and inwardly-curving relationship; a curved middle section front seal attached to the leading edge of said middle section and projecting from said leading edge of said middle section in upwardly and outwardly curving relationship; a middle section rear seal base attached to the trailing edge of said middle section and a middle section rear seal tip projecting from said middle section rear seal base in downwardly and inwardly-curving relationship; and an end section front seal attached to the leading edge of said end section and projecting from said leading edge of said end section in upwardly and outwardly curving relationship.

2. The collapsible camper top of claim 1 further comprising a pair of rear window tracks attached to said end section in spaced, substantially parallel relationship and a rear window slidably carried by said rear window tracks for selectively closing said end section responsive to slidably removing said rear window from said rear window tracks and opening said end section responsive to slidably replacing said rear window in said rear window tracks.

3. The collapsible camper top of claim 1 wherein said at least one middle section is a single middle section.

4. The collapsible camper top of claim 2 wherein said at least one middle section is a single middle section and further comprising a front access panel carried by one of said front section sides in slidable relationship, a middle access panel carried by one of said middle section sides in slidable relationship and an end access panel carried by one of said end section sides in slidable relationship.

5. The collapsible camper top of claim 1 further comprising a roller plate carried by each side rail of the pick-up truck, respectively, said roller plate each provided with a plurality of parallel slots; first roller means carried by each of said middle section sides, said first roller means provided with a plurality of first rollers disposed in a first one of said parallel slots, respectively; and second roller means carried by each of said end section sides, said second roller means provided with a second plurality of rollers disposed in a second one of said parallel slots, respectively, whereby said first plurality of rollers and said second plurality of rollers travel in said first one of said parallel slots and said second one of said parallel slots, respectively, in said roller plate responsive to extension and retraction of said middle section and said end section with respect to said front section.

* * * * *